S. TODD.
GRAIN-SEPARATORS.

No. 195,184. Patented Sept. 11, 1877.

UNITED STATES PATENT OFFICE.

SIMEON TODD, OF HOUSTON, MINNESOTA.

IMPROVEMENT IN GRAIN-SEPARATORS.

Specification forming part of Letters Patent No. 195,184, dated September 11, 1877; application filed February 10, 1877.

*To all whom it may concern:*

Figure 1:
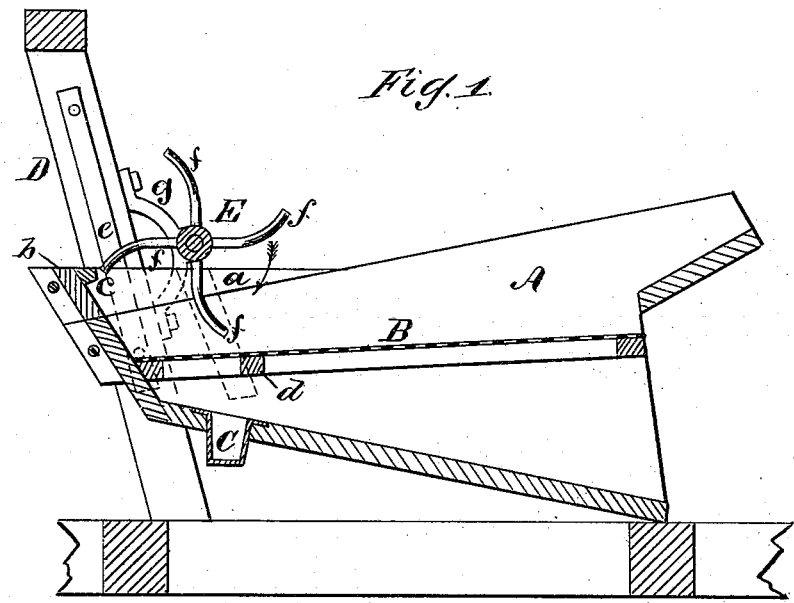
Figure 2:
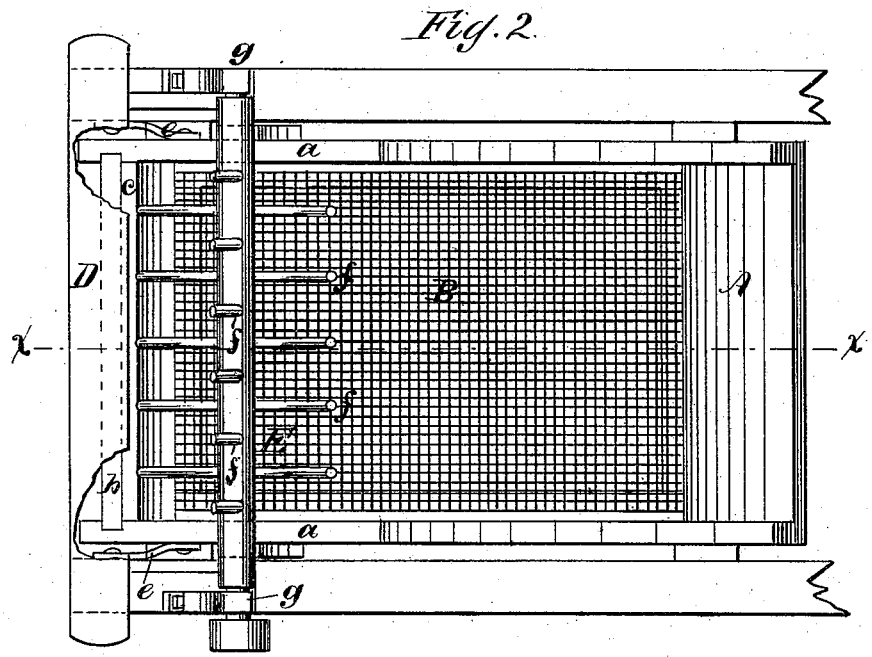

Be it known that I, SIMEON TODD, of Houston, in the county of Houston and State of Minnesota, have invented a new and Improved Picker for Thrashing-Machines, of which the following is a specification:

Figure 1 is a longitudinal section on line $x$ $x$ in Fig. 2. Fig. 2 is a plan view.

Similar letters of reference indicate corresponding parts.

The invention will first be described in connection with the drawing, and then pointed out in the claim.

Referring to the drawing, A is the ordinary sieve-box of a thrashing-machine, having an extension at the rear end consisting of the triangular side pieces $a$ and the end piece $b$, which are attached to and form a part of the sieve-box. A rib, $c$, is attached to the inner surface of the end piece $b$, near its upper edge.

B is the ordinary wire-cloth sieve, placed in the box A, and stiffened and supported by the transverse bar $d$, placed under it near its rear end, and attached to the sides of the sieve-box.

C is a spout, for conveying grain to the elevator that is placed in the bottom of the sieve-box, near its rear end. The sieve-box is supported by straps $e$, that are attached to it and to the frame D.

E is a picker, having curved teeth $f$ made of wires or rods, which are placed in holes bored through the picker-shaft, the teeth being arranged in rows and alternating in position in the successive rows, as shown in Fig. 2. The picker-shaft is supported by brackets $g$, that are attached to the frame D in such a position that its teeth rotate in proximity to the wire-cloth sieve B, and also to the rib $c$ of the end piece $b$.

The straw in passing from the machine is carried over the sieve B, and is agitated and moved rearward by the teeth of the picker, which rotate in the direction indicated by the arrow in Fig. 1.

The sieve is, by this device, kept clean under all circumstances, and grain is prevented from escaping with the straw, or from being blown out by the current created by the fan. The rib $c$ checks much of the grain that would otherwise be swept over the end piece by the straw, or driven over it by the blast. The bar $d$, in addition to strengthening and supporting the sieve, serves to check a portion of the grain that is blown rearward.

What I claim as new and of my invention is—

The combination, in a picker for thrashing-machines, of the revolving picker E $f$, and the shaking shoe, having the screen B and the end board, provided on its inner edge with the rib C, as and for the purpose set forth.

SIMEON TODD.

Witnesses:
   S. B. MCINTIRE,
   CHRIST NELSON.